Figure 1:
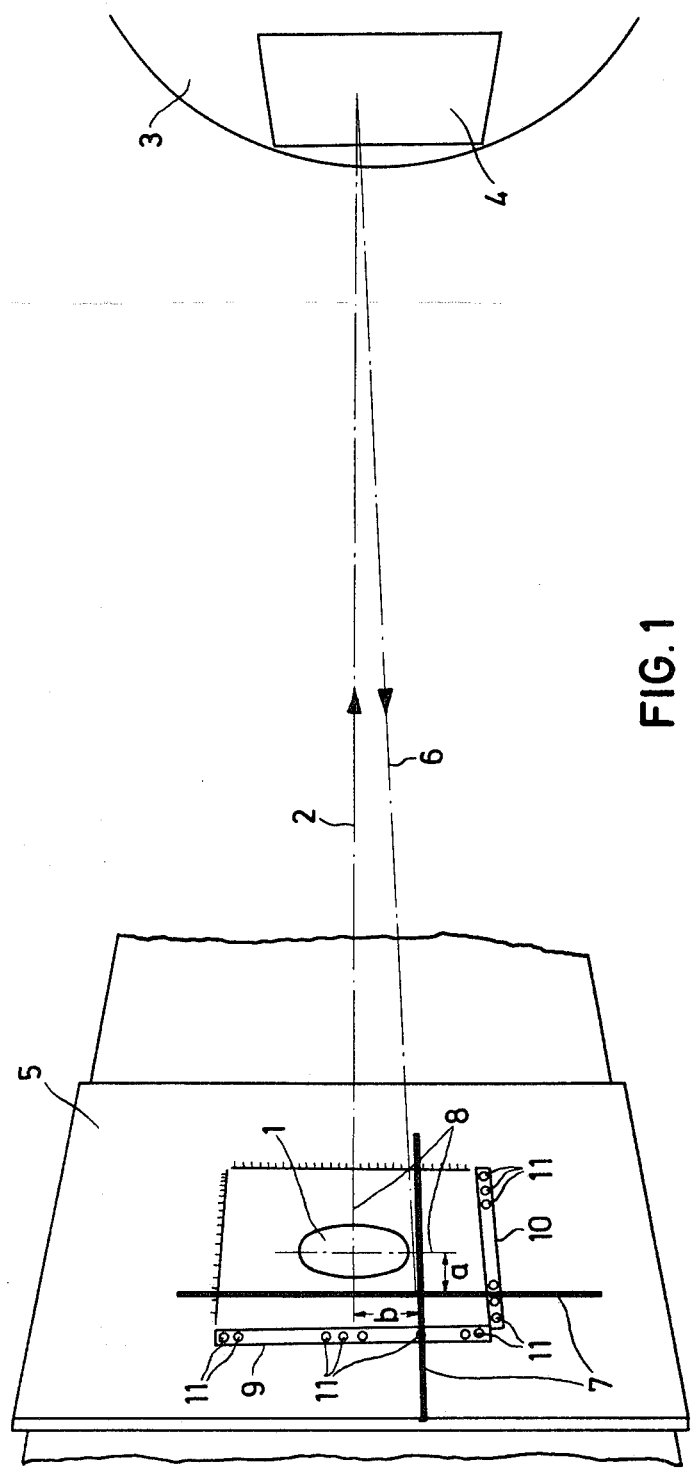

United States Patent [19]

Spengler et al.

[11] 3,709,609
[45] Jan. 9, 1973

[54] METHOD AND APPARATUS FOR OPTOELECTRONIC AXLE MEASUREMENT OF MOTOR VEHICLES

[75] Inventors: Erich Spengler; Horst Boning, both of Wolfsburg; Heiko Requardt, Gifhorn, all of Germany

[73] Assignee: Volkswagenwerk AKT, Wolfsburg, Germany

[22] Filed: Aug. 26, 1970

[21] Appl. No.: 66,913

[30] Foreign Application Priority Data

Aug. 27, 1969 Germany......................P 19 43 465.2

[52] U.S. Cl..................356/152, 33/46 W, 250/230, 356/155
[51] Int. Cl..............................................G01b 11/27
[58] Field of Search.............356/152, 155; 33/46 W; 250/230

[56] References Cited

UNITED STATES PATENTS 3,614,238  10/1971  Stites.................................356/152
3,533,699  10/1970  Hopkins et al. .......................356/155
3,363,504  1/1968  Lill......................................356/155
2,700,319  1/1955  Carr....................................356/155
3,197,643  7/1965  Morris..................................356/152

FOREIGN PATENTS OR APPLICATIONS 451,532  5/1968  Switzerland..........................356/155

Primary Examiner—Ronald L. Wibert
Assistant Examiner—J. Rothenberg
Attorney—Watson, Cole, Grindle & Watson

[57] ABSTRACT

A method and apparatus for the measurement of camber and toe-in of motor vehicles by reflecting a cross-hair pattern from a screen mounted to the vehicle wheel onto a viewing screen so that the cross-hair pattern intersects an orthogonal set of sensors mounted to the viewing screen. A digital read-out of the displacement of the cross-hair pattern from a reference position designates camber and toe-in on a respective axis of the sensors. A continuity of the read-out is assured by ensuring that the width of the cross-hair pattern on the viewing screen overlaps two adjacent sensors and logic circuitry establishes a nonambiguous read-out by selecting the signal from the more remote sensor.

5 Claims, 7 Drawing Figures

| $Ph_1$ | $Ph_2$ | $Ph_3$ | $A_1$ | $A_2$ | $A_3$ |
|---|---|---|---|---|---|
| − | − | − | L | L | L |
| X | − | − | 0 | L | L |
| − | X | − | L | 0 | L |
| − | − | X | L | L | 0 |
| X | X | − | 0 | L | L |
| − | X | X | L | 0 | L |

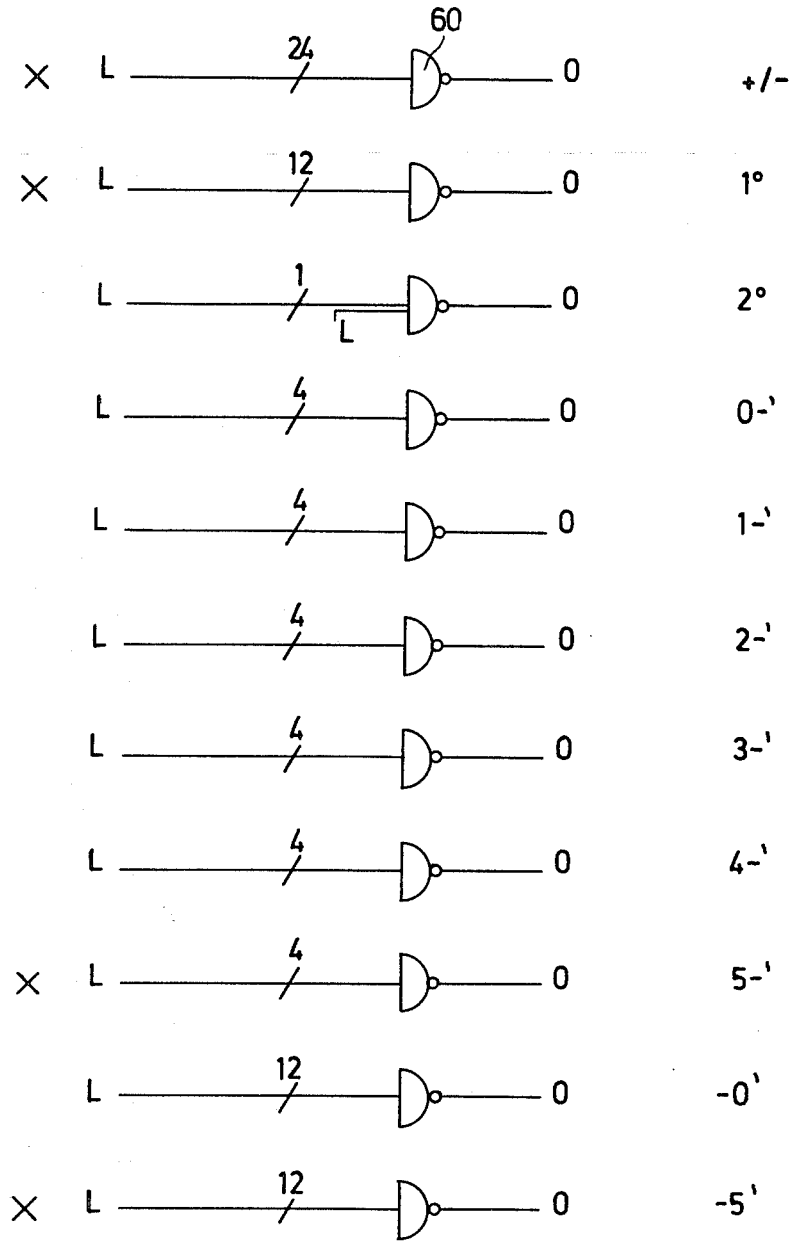

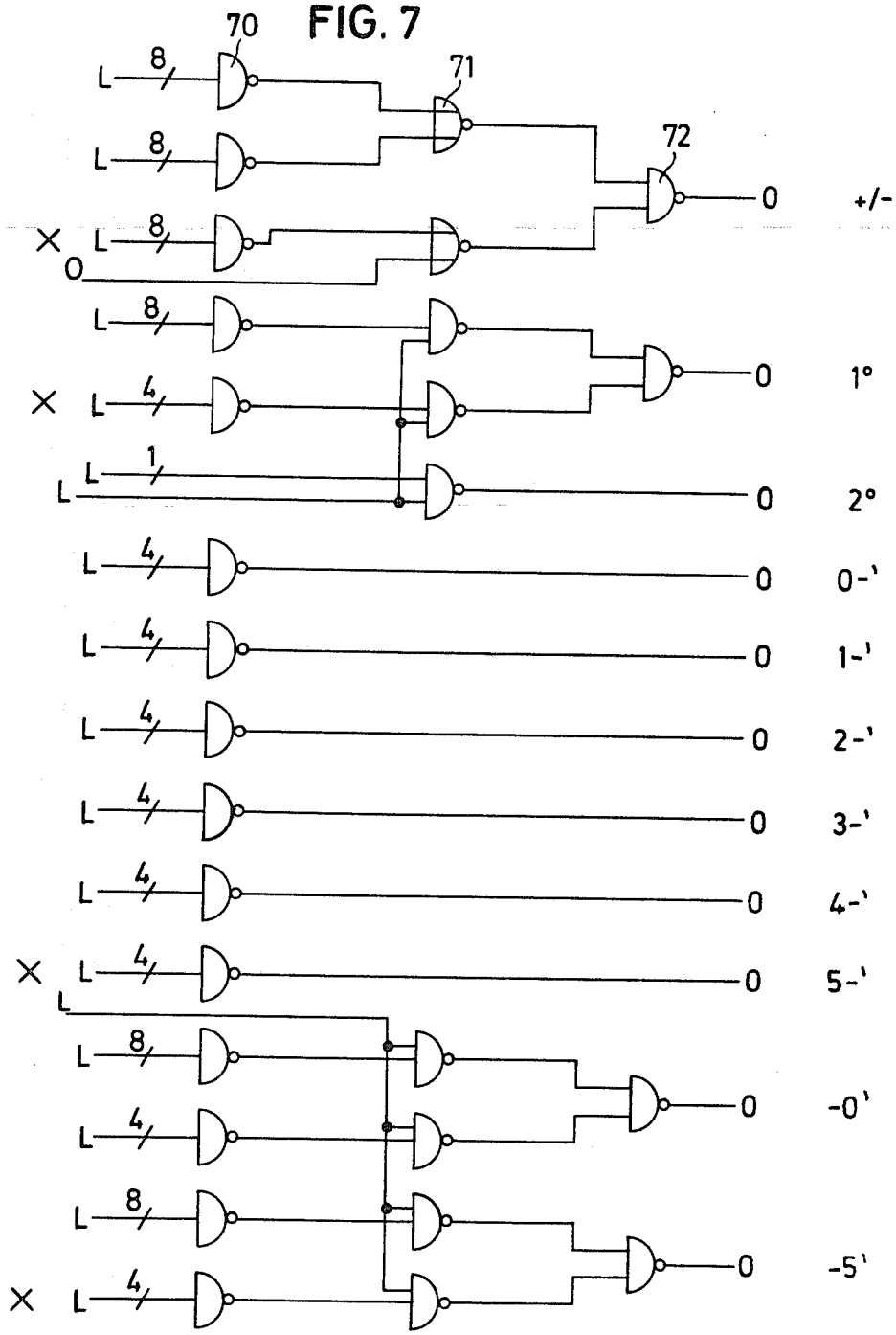

METHOD AND APPARATUS FOR OPTOELECTRONIC AXLE MEASUREMENT OF MOTOR VEHICLES

This invention relates to a projection method and apparatus for the measurement of the axial alignment of motor vehicles which produces a quick, precise and automatic detection of camber and toe-in. Customarily, optical methods and scanning procedures are used for the measurement of alignment quantities. In the case of optical projection methods, the position of a projected set of axes to a fixed set of reference axes is adduced for the measurement of camber and toe-in. Other optical methods use, instead of the projector, a sighting device, with the aid of which measuring points are made to cover each other visually whereby the position of the sighting device supplies the camber and toe-in values. In the case of scanning methods, the position of the front wheel rims or of a flat disk attached thereon is scanned from a reference position each time with three displacement pickups. The output voltages of the pickups are proportional to the displacement and are associated in such a way that the camber and toe-in values can be read from analog recording instruments. None of these known methods provides for an automatic digital detection and processing of these measuring values in EDV electronic data processing installations.

As is well known, camber is defined as the pertinent in-clination of the wheel as compared to a vertical axis and toe-in, on the other hand, is defined as the angle which the horizontal wheel axis makes with respect to a horizontal reference axis.

A rapid axle measurement of motor vehicles has become more and more a necessity because of the large number of vehicles, and an automatic detection of the camber and toe-in values is desirable. According to the invention this object is solved by an improved projection method and apparatus, characterized by the fact that an intersecting pair of axes is projected by means of a mirror attached on one wheel of the axle onto a screen and the displacement of the position of the projected intersection of axes from a fixed intersection of axes are detected as measuring values by optoelectronic transducer elements arranged at definite positions of the screen and the transducer input signals fed to a logic matrix which triggers a digital readout.

The conversion of the measuring values, available at first in analog form, into digital values in the manner according to the invention, first of all offers the possibility of processing the camber and toe-in values in electronic data processing installations and to print them, for example, on inspection records.

Either a light hairline cross or a dark hairline cross, can be projected onto a projection screen. In the first instance therefore, only those optoelectronic construction elements, for example, photo transistors, are illuminated which are struck directly by the projected intersection of axes, for example, a hairline cross, while in the second instance the arrangement must be made in such a way that all other elements are illuminated while only those electronic elements remain not illuminated which in each instance are stuck by the intersection of axes. In the case of such designs of the invention the logical circuit connected with the various electronic elements must, in both instances, be built up differently.

The preferred arrangement to carry out the method according to the invention has the advantage that a projector, which projects the intersection of axes is arranged in the middle of the screen and the optoelectronic transducer elements at the edge thereof. If the legs of the projected intersection of axes are sufficiently long, then one merely requires two arrangements in the manner of series of optoelectronic transducer elements at the edge of the screen for the detection of the camber and the toe-in.

A specific measuring value for the camber or the toe-in is assigned to each of the optoelectronic transducer elements. Theoretically, such a precise measurement is possible, that the projected intersection of axes on the screen indicates a measuring value which lies between these measuring values which are assigned to two adjoining optoelectronic transducer elements. If the width of the legs of the projection intersection of axes is smaller than the distance between two adjoining optoelectronic transducer elements, then no recording whatever would take place, since no optoelectronic transducer element is struck by the intersection of axes. For this reason the width of the projected intersection of axes is made somewhat larger than the distance between two adjoining optoelectronic transducer elements. But unless counter measures are taken two of the optoelectronic transducer elements would be covered by the projected intersection of axes. In order to eliminate such an inaccuracy of measurement, interlocking switch systems are assigned effectively to adjoining optoelectronic transducer elements, which, insofar as the projected intersection of axes covers up two adjoining transducer elements, will permit delivery of a signal only by the optoelectronic transducer element assigned to the more unfavorable measuring value. These interlocking switch systems therefore will block one of the two transducer elements which would indicate the presence of a somewhat too good measuring value and they will permit a signal only from the other of these two transducer elements.

Referring now to the drawings, the various figures show designs by way of example, for the various parts of an arrangement which is suitable to carry out the projection method according to the invention, and actually, FIG. 1 is a perspective view of the parts for the direct measurement of analog values of toe-in and chamber, while camber, FIGS. 2 to 7 relate to various parts of a logical circuit for obtaining digital values corresponding to the measured values.

With respect to FIG. 1, then the essential components of the arrangement are the projector 1 emitting or transmitting an intersection of axes, the mirror 4 attached at the front side of the wheel 3 and illuminated by the emitted intersection of axes 2, and the screen 5, which is struck at one place by the projected beam indicated by the path of rays 6, which place depends on the inclination of mirror 4 and thus on the toe-in and the camber of wheel 3. The path of rays 6 develops therefore, by specular reflection of the intersection of axes 2 on mirror 4, and correspondingly, it defines the projected intersection of axes 7 on the screen 5.

The position of the projected intersection of axes 7 in relation to that of the fixed intersection of axes 8, the starting point of which coincides with the central point of projector 1, is therefore a measure for toe-in and camber of the checked wheel. In the structure shown and given by way of example, the distance a therefore corresponds to the toe-in and the distance b to the camber of the wheel 3, whereby the position of the distances a and b to the left and to the right of the perpendicular axis, or else above or below the horizontal axis of the fixed intersection of axes 8, determines the algebraic sign of toe-in and camber.

The arrangement according to FIG. 1 and according to the invention has also been equipped for automatic digital detection and standard recording of the measured values. For this purpose two rows 9 and 10 of photo transistors 11 have been provided as optoelectronic transducer elements in the area of screen 5, which elements, because the projector 1 is located in the center of the screen 5, are provided approximately at the edge of the illuminated area of the screen. As FIG. 1, shows, both in row 9 and row 10, individual photo transistors are covered up by the axes of the projected intersection of axes 7, that is to say, they are irradiated by the intersection of axes, so that signals can only be produced in the circuits of these photo transistors, which signals are fed to a logical circuit for the projection of signals which are suitable for evaluation or interpretation.

Figure 2:
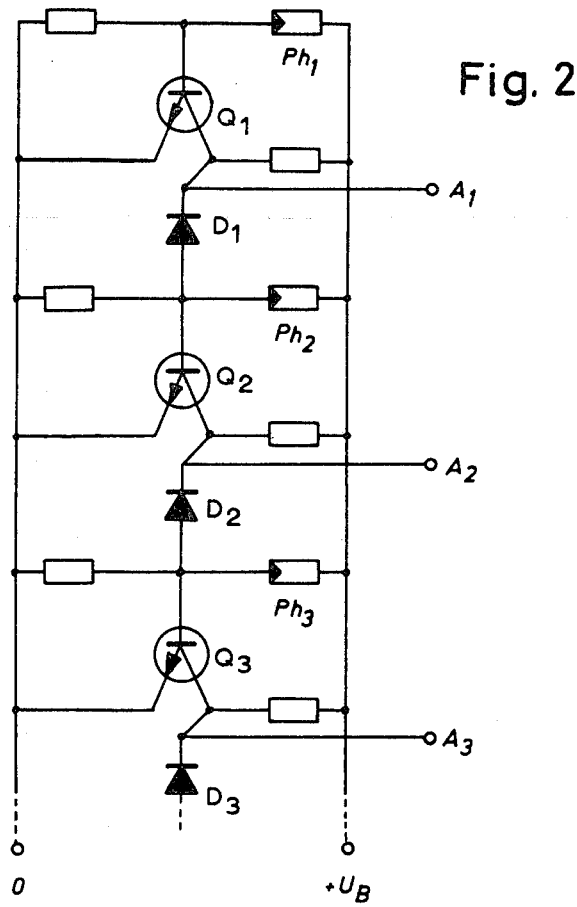

No difficulties will develop if, as drawn in the case of row 9, the pertinent leg of the projected intersection of axes 7 covers only one photo transistor. Since however the leg of this intersection of axes must have a width which is more than the distance between adjoining transistors in order that a signal of the transistor circuit be projected for every position of the projected intersection of axes 7, and thus in the case of every value of toe-in and camber of wheel 3, two adjoining photo transistors are excited simultaneously by the projected intersection of axes 7. But in order to assure even, in that case, an unequivocal signal delivery, an interlocking arrangement has been provided in the coupling of the photo transistors shown in FIG. 2. For example, in every one of the rows of transistors designated in FIG. 1 by 9 and 10, so that in the case where two adjoining photo transistors are excited by the projected intersection of axes, only that transistor will be able to cause the emission of a signal which is assigned in each instance to the poorer value. In FIG. 2, Ph designates any desired transistors, which are designated in FIG. 1 by numeral 11. In detail, the circuit according to FIG. 2 operates as follows:

In the case of an unilluminated photo transistor $PH_1$, the base potential of the transistor $Q_1$ lies very close to zero volts. The transistor is nonconducting, the operating voltage $U_B$ being connected to the output $A_1$. The diode $D_1$ is biased in the blocking direction and thus represents a high resistance. If now the photo transistor $Ph_1$ is illuminated, then its resistance drops and lifts the base potential of transistor $Q_1$, a base current flows, and the transistor becomes conductive. With that, the voltage at output $A_1$ drops to zero volts, the diode $D_1$ is now biased in the forward direction and places the base potential of the transistor $Q_2$ to zero volts. Now the transistor $Q_2$ is blocked, even if the photo transistor $Ph_2$ is illuminated. Thus, the unambiguity of the record-ing is assured. The function of the circuit has been covered in FIG. 2 by way of a table at the bottom thereof in which, ( x: illuminated photo transistor , L = operating voltage; O = zero potential)

Figure 4:
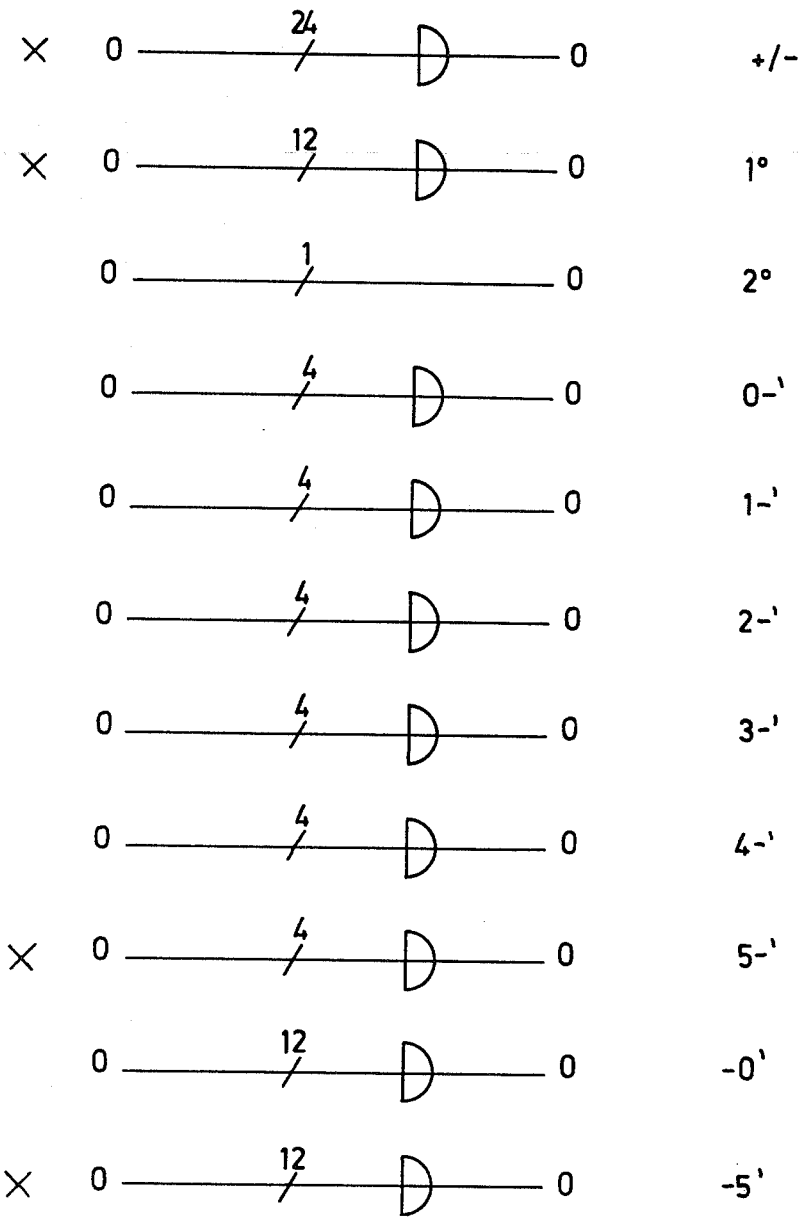
Figure 5:
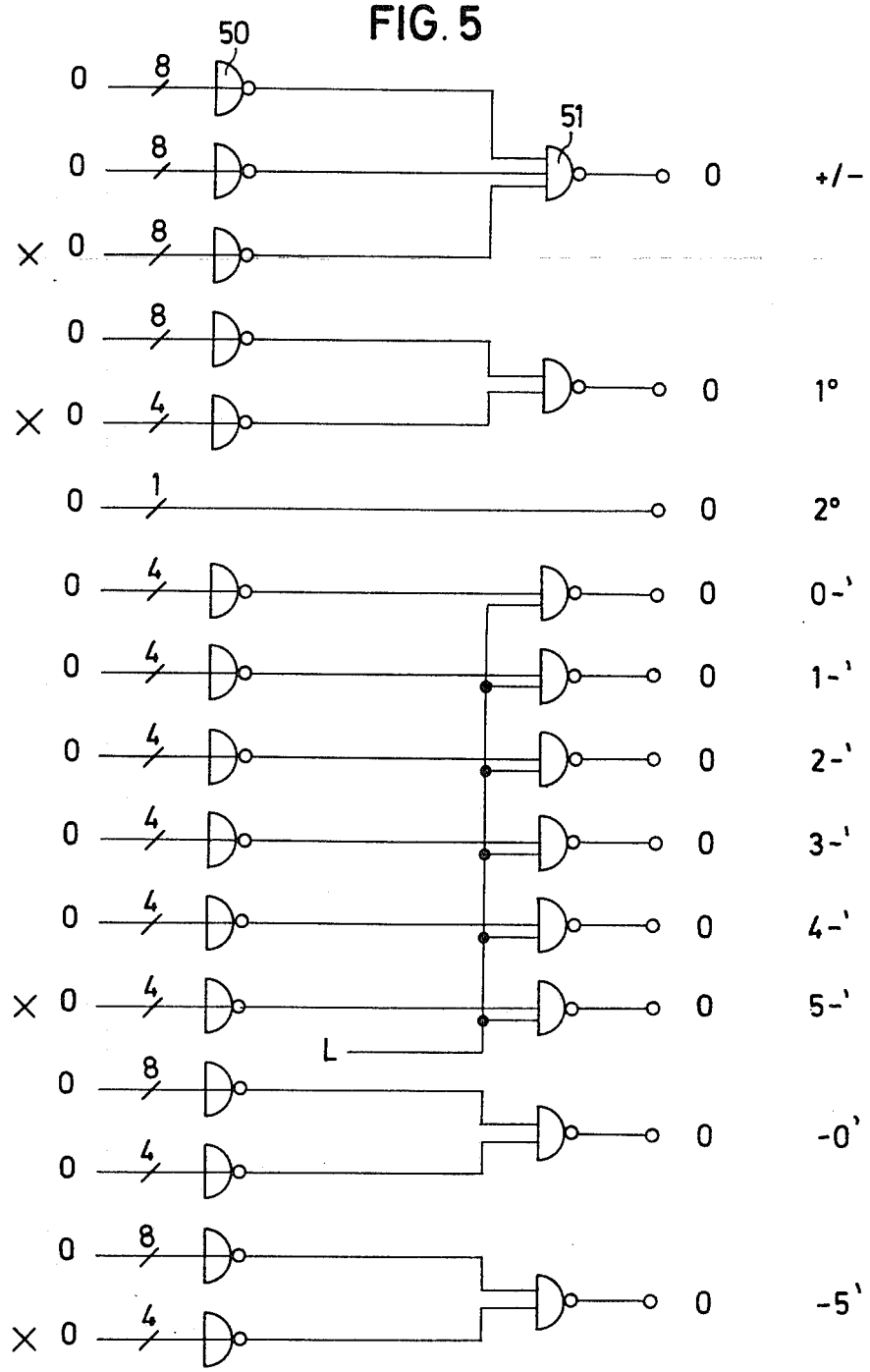

It turns out as a rule that a measuring precision of ± 2.5' is sufficient for the safety of the vehicle, and it is therefore sufficient to maintain a distance of 5' between two adjoining photo transistors. For example, for every semi-axis of the projected intersection of axes, 24 photo transistors can be provided which operate, for example, in the manner of the logical circuit described hereinafter. The logical circuit can be subdivided into the coupling matrix shown in FIG. 3 and connected according to FIG. 2 directly to the outputs of the circuit and into a gate circuit which is shown in FIGS. 4 and 6. Additionally, FIGS. 5 and 7 represent practical designs depending on whether the projected intersection of axes is a light cross or a dark cross. The designs by way of example according to FIGS. 5 and 7 differ from the basic circuits according to FIGS. 4 and 6 merely by the fact that they have been adapted to the inputs from elements obtainable commercially.

Figure 3:
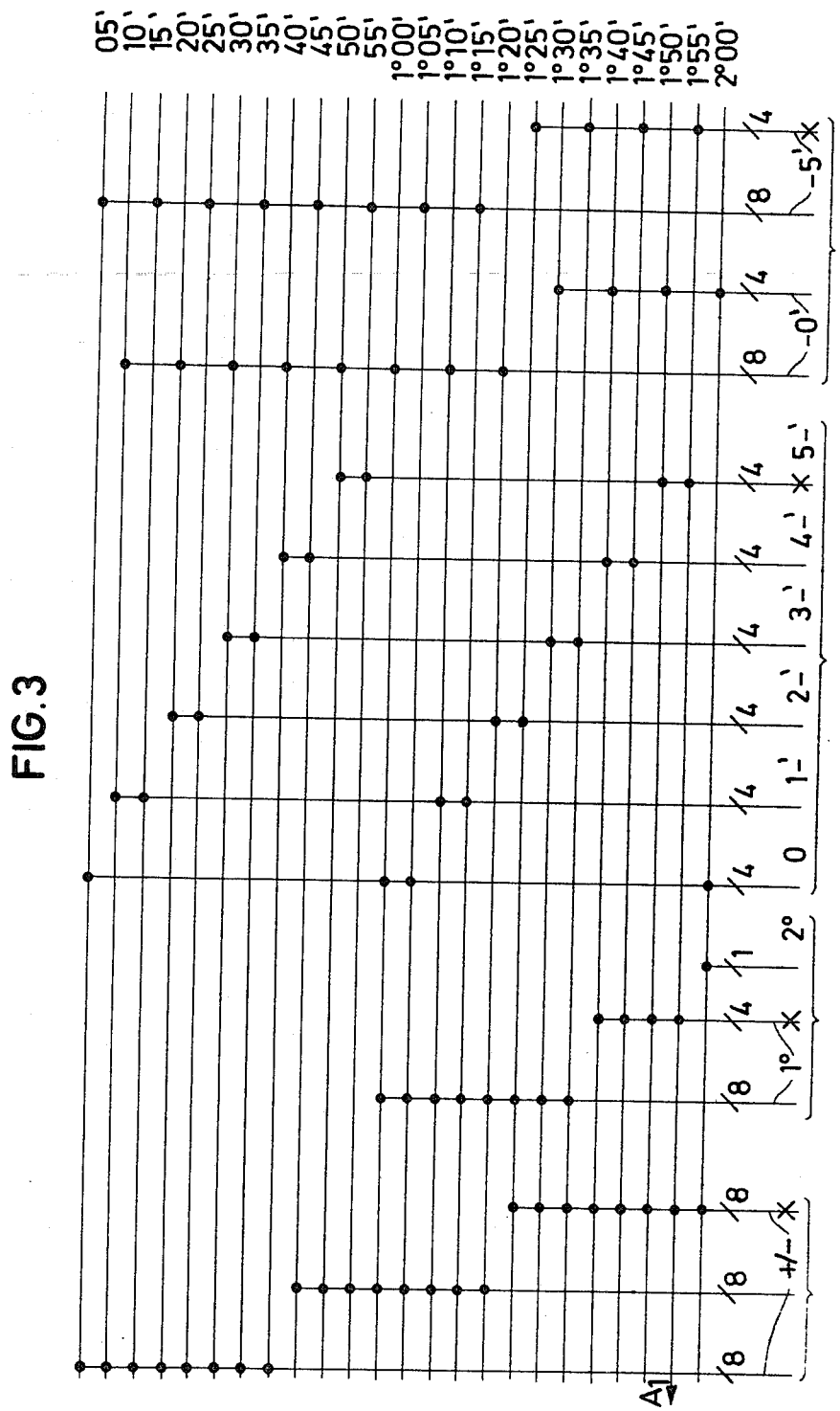

The coupling matrix transducer according to FIG. 3 consists of horizontal and perpendicular con-ductors which have been electrically coupled with one another at certain places. The horizontal circuits are all connected with one of the outputs of the transistor circuits designated in FIG. 2 by $A_1$, $A_2$, etc., while the perpendicular circuits lead to the gate circuit. As can be seen from the numerical values to the right in FIG. 3, a certain measuring value has been assigned to each horizontal circuit and this assignment corresponds naturally to the assignment of the transistor with the output $A_1$, etc., to which each circuit is respectively connected. If it is assumed that the transistor $Ph_1$ in the circuit according to FIG. 2 is assigned the measuring value of 1° 55' and if it is further assumed that exactly this transistor $Ph_1$ is covered by the projected intersection of axes, then the coupling matrix according to FIG. 3 will connect quite definite perpendicular circuits (which lead to the connected gate circuit) with the output $A_1$ in FIG. 2. The circuits in the coupling matrix in sequence from left to right, have first of all three circuits each containing eight wires provided for the recording of the algebraic sign. Additionally there follow three circuits of which the first has eight wires, the second four wires and the third has one wire, for recording of the complete number of degrees. Then there are six circuits each with four wires for recording of the tens of minutes and finally four circuits, two of which have eight wires and two four wires for recording of the minutes. This summarization by groups has been indicated each time by a bracket. In the example where it has been assumed that the measuring value amounts to + 1°55', the outputs of the coupling matrix according to FIG. 3, designated with an X, are engaged.

A gate circuit as indicated in principle in FIG. 4 is connected with these output circuits of the coupling matrix. The assignment of the individual branches of the gate circuit to the outputs of the coupling matrix according to FIG. 3 is in the right-hand part of the figure, where again first of all, below one another, the recording of the algebraic sign and then the angular values have been noted. In principle, every one of the branches in the circuit according to FIG. 4 contains an OR member, therefore an OR circuit, which assures, insofar as an L signal appears on an incoming circuit, that an L signal will likewise appear at the output of the OR element. In the example which has been assumed, the inputs again designated by an X in FIG. 4 would be engaged, therefore each time an L signal would be at the outputs of the corresponding OR elements.

FIG. 5 shows a circuit design of the circuit principle according to FIG. 4, which was made with the point of view that circuit elements with a maximum of eight engaged inputs are to be used. In the design assumed by way of example therefore, the engagement of the outputs at the coupling matrix according to FIG. 3 are compared, in FIG. 5 the inputs marked again with an X are connected with the coupling matrix. While in FIG. 4 simple OR elements are used, each branch in FIG. 5 contains the sequence of a NOR element, one of which has been designated by the numeral 50 and which are arranged perpendicularly one below the other, and a NAND circuit, one of which has been designated by 51 and which also are shown one below the other.

For an understanding of the various circuits, it will be effective to view the circuits using the following table in which the engagement of the inputs of the pertinent circuit element with an O signal or L signal is shown in columns E1 and E2, while the output signals of the pertinent circuit element are given in the three right-hand columns with the pertinent engagement of the input signals:

| E1 | E2 | NAND | OR | NOR |
|----|----|------|----|----|
| O | O | L | O | L |
| L | O | L | L | O |
| L | L | O | L | O |
| O | L | L | L | O |

If one therefore assumes, for example, that on one of the eight input wires of a NOR element 50 an L signal will appear in the circuit according to FIG. 5, for example, in the third branch corresponding to the measuring value 1°, then on the output side according to the table there is an O signal on the NOR element and the NAND gate 51 contains only an O signal on the input side. The result of this according to the table is that it delivers an L signal on the output side which is then processed further in an electronic data processing installation or is used directly for the digital recording or for the written recording of the measuring value in a test report.

Hitherto the assumption was made that the projected intersection of axes is a light intersection cross. If on the other hand, there is a dark intersection cross, then the circuit according to FIGS. 4 and 5 must be established according to the circuit shown in FIG. 6 and FIG. 7,. In this case a negation will have to take place even in the operating circuit according to FIG. 6, that is to say those switching elements whose inputs are acted upon by an L signal, must deliver on the output side an O signal.

This is due to the fact that in this case all photo transistors are illuminated with the exception of those which are covered up by the darkly projected intersection of axes, but only the recording of the last mentioned photo transistors is of interest. Correspondingly, the branches of the principal circuit according to FIG. 6 contain NAND elements 60, which have been drawn as lying perpendicularly below one another. Again those inputs are provided with an X which are charged with a signal in the assumed numerical example, 1°55′, which signal in the case of a dark projected intersection of axes is an O signal. As the above table shows, the NAND elements deliver an L signal on the output side only when anyone of their inputs is acted upon by an O signal.

FIG. 7 finally shows the development of the switching principle according to FIG. 6 by way of actual circuits. Again the inputs, which in the numerical example have been assumed as acted upon, are designated by an X. The individual branches in this case contain the sequence of a NAND element 70, of a NOR element 71 and of a NAND element 72. The elements of the same type in the various branches are again drawn as being one below the other. In the normal case, whenever therefore all photo transistors are exposed (therefore all inlets are fed L signals), there are O signals at all outputs of the circuit according to FIG. 7. When the projected intersection of axes covers a photo transistor whose output therefore delivers an O signal, there will be an L signal at the output of the pertinent NAND element 70 which is converted by the assigned NOR element 71 into an O signal. Because of the method of operation of the NAND element, there will however again be an L signal at the input.

Essential advantages of this automatic measuring method are to be found in the rapid and precise detection of the measuring values, whereby the reading and the transfer mistakes of a visual examination can be avoided.

We claim:
1. Apparatus for the measurement of the alignment of a wheel, comprising:
   means mounted to the wheel for reflecting an image;
   means for projecting an image of a coordinate pair of orthogonal axes to said means for reflecting, said image being reflected therefrom;
   means for receiving the reflected image, said receiving means including an orthogonal arrangement of optoelectronic transducer elements mounted with respect to a fixed reference point for digital measurement of displacements of the axes of the reflected image from said fixed reference point, each of said optoelectronic transducer elements providing an output signal indicative of a specific displacement from said fixed reference point when intersected by an axis of said reflected image and the axes of the reflected image having a width at least as wide as the maximum distance between any two adjoining optoelectronic transducer elements; and
   digital processing means connected to said optoelectronic transducer elements for generating a digital output indicative of the displacement of said wheel in each of two orthogonal directions in accordance with the image received by said means for receiving.
2. Apparatus as in claim 1 wherein with two of said adjoining optoelectronic transducer elements receiving said reflected image, said digital processing means for providing a digital output signal including means for selecting a response from only one of said optoelectronic transducer elements.

3. Apparatus as in claim 1 wherein said means for receiving is a screen, said means for projecting comprises a projector mounted at the center of said screen, and said arrangement of optoelectronic transducer elements consists of a column and row of said elements mounted along intersecting edges of said screen.

4. Apparatus as in claim 1 wherein the projected pair of orthogonal axes is a light image.

5. Apparatus as in claim 1 wherein the projected pair of orthogonal axes is a dark image.

* * * * *